March 29, 1927.
H. A. O'HAVER
CUP MEASURE
Filed Nov. 22, 1926
1,622,967
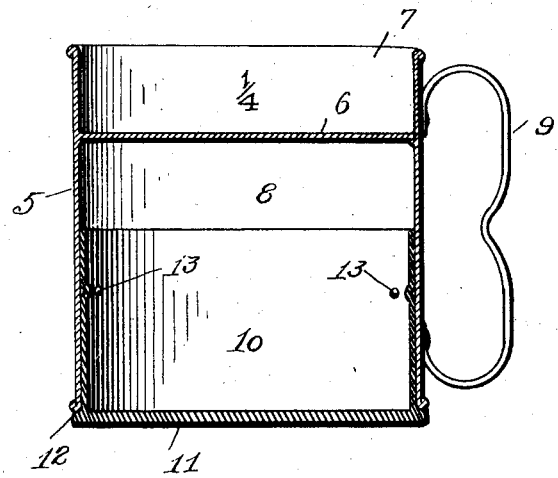
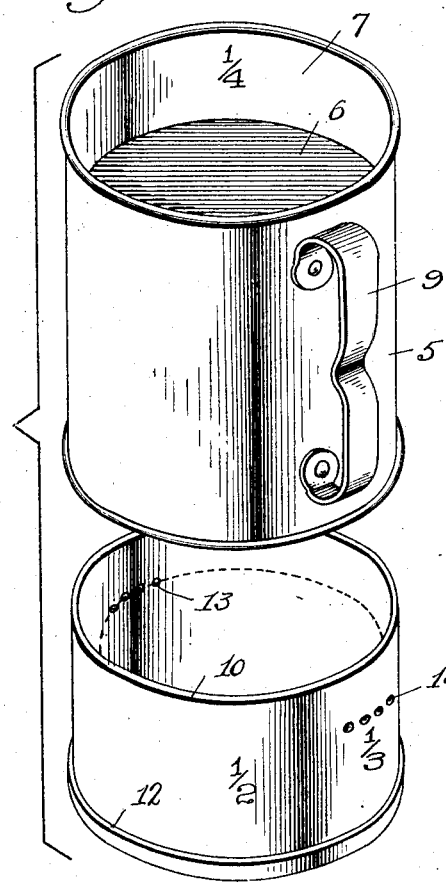
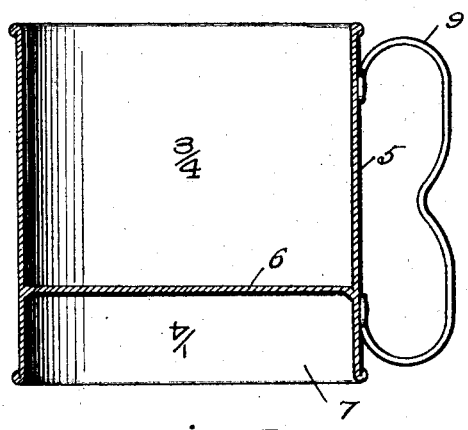
Inventor
Helen A. O'Haver
Davis & Davis
By
Attorneys Patented Mar. 29, 1927.

1,622,967

UNITED STATES PATENT OFFICE.

HELEN AUGUSTA O'HAVER, OF TOPSHAM, MAINE.

CUP MEASURE.

Application filed November 22, 1926. Serial No. 149,989.

The object of this invention is to provide a simple, inexpensive kitchen utensil adapted for measuring fractions of cupfuls, the construction being such that it is especially adapted for measuring non-flowing substances, such as butter, lard, etc.

In the drawing—

Fig. 1 is a vertical sectional view of the device adapted for measuring one-fourth cup;

Fig. 2 is a perspective view of the same with the one-half cup disconnected;

Fig. 3 is a vertical sectional view similar to Fig. 1, but with the cup reversed and adapted to be used for measuring three-fourths cup.

Referring to the drawing annexed, 5 designates the cup body which is an open-ended cylinder having the capacity as a whole of one cupful. Near one end of this cylinder is affixed an imperforate diaphragm 6, positioned to divide the cylinder into a one-fourth-cup cavity 7, and a three-fourths-cup cavity 8. On the side of the cylinder is affixed a handle-loop 9 which is desirably double or symmetrical, i. e., both ends curved alike, so that this handle may be conveniently used which ever measure, 7 or 8, is in use.

Adapted to be pushed into the three-fourths-cup measure 8 is a one-half-cup measure consisting of a cylindrical part 10 adapted to fit frictionally into the measure 8 and provided with a closure-disk 11 which, when the measure 10 is pushed into the measure 8, serves as a bottom not only for the measure 10 but for the cup as a whole. The bottom disk 11 is extended at its rim to form a bead 12 which strikes against the rim of the measure 8 and serves as a stop-member; this bead 12 also serves as a hand-gripping ring for insertion of the half-cup measure. Indentations or other marks 13 are made in the cylinder 10 at a short distance from its upper edge, to indicate a one-third-cup measure, to thus make it possible to utilize this one-half-cup measure for measuring thirds.

It will be observed that this device is particularly adapted for measuring such non-flowing substances as lard, butter, etc., since all the fractions except the one-third cup may be accurately measured by leveling off the material by stroking the rim of the measure with a knife-blade or other straight-edge. The one-third cup cannot be as accurately stroked as the other measures, but, in view of the fact that the line indicating this one-third-cup measure is near the rim of the one-half-cup measure, it will be a comparatively simple matter to trim off the surplus down to the line and thus obtain comparative accuracy. It is desirable that fastening devices for the one-half-cup measure 10 be omitted, as the friction of this cup against the interior of the measure 8 will be sufficient to hold this one-half-cup measure in place; suitable locking devices may be employed, however, if desired, to prevent this one-half-cup measure becoming accidentally disconnected and lost.

What I claim as new is:

1. A cup measure consisting of an open-ended cylinder having a diaphragm extending across its interior at a point to convert one end into a three-fourths-cup measure and the other end into a one-fourth-cup measure, and a one-half-cup measure consisting of a cylinder adapted to fit into the three-fourths-cup measure and provided with a bottom disk which serves when the one-half-cup measure is thus fitted into the three-fourths-cup measure not only as a bottom for this one-half-cup measure but also as a bottom for the cup as a whole.

2. A cup measure consisting of an open-ended cylinder having a diaphragm extending across its interior at a point to convert one end into a three-fourths-cup measure and the other end into a one-fourth-cup measure, and a one-half-cup measure consisting of a cylinder adapted to fit into the three-fourths-cup measure and provided with a bottom disk which serves when the one-half-cup measure is thus fitted into the three-fourths-cup measure not only as a bottom for this one-half-cup measure but also as a bottom for the cup as a whole, said one-half-cup measure being provided with marks at a distance from its rim to indicate a one-third-cup measure.

3. A cup measure consisting of an open-ended cylinder having a diaphragm extending across its interior at a point to convert one end into a three-fourths-cup measure and the other end into a one-fourth-cup measure, and a one-half-cup measure consisting of a cylinder adapted to fit into the threefourths-cup measure and provided with a bottom disk which serves when the one-half-cup measure is thus fitted into the three-fourths-cup measure not only as a bottom for this one-half-cup measure but also as a bottom for the cup as a whole, the bottom of said one-half-cup measure being extended to form a gripping-ring or bead adapted to abut against the rim of the three-fourths-cup measure.

In testimony whereof I hereunto affix my signature.

HELEN AUGUSTA O'HAVER.